(12) United States Patent
Neate

(10) Patent No.: US 8,461,751 B2
(45) Date of Patent: Jun. 11, 2013

(54) LIGHT SOURCE

(75) Inventor: Andrew Simon Neate, Aylesbury (GB)

(73) Assignee: Ceravision Limited

( * ) Notice: Subject to any disclaimer, the term of this patent is extended or adjusted under 35 U.S.C. 154(b) by 38 days.

(21) Appl. No.: 13/107,007

(22) Filed: May 13, 2011

(65) Prior Publication Data

US 2011/0285286 A1 Nov. 24, 2011

Related U.S. Application Data

(63) Continuation of application No. 12/671,088, filed as application No. PCT/GB2008/003829 on Nov. 14, 2008, now Pat. No. 8,089,203.

(30) Foreign Application Priority Data

| Nov. 16, 2007 | (GB) | .................................. | 0722548.5 |
| May 23, 2008 | (GB) | .................................. | 0809471.6 |
| Aug. 12, 2008 | (GB) | .................................. | 0814699.5 |
| Aug. 12, 2008 | (GB) | .................................. | 0814701.9 |

(51) Int. Cl.
*H01J 65/04* (2006.01)

(52) U.S. Cl.
USPC ........... 313/160; 313/607; 313/634; 313/161; 315/248

(58) Field of Classification Search
None
See application file for complete search history.

(56) References Cited

U.S. PATENT DOCUMENTS

| 4,266,167 | A | 5/1981 | Proud |
| 5,227,698 | A | 7/1993 | Simpson |
| 5,834,895 | A | 11/1998 | Dolan |
| 6,093,921 | A | 7/2000 | Gaisford |
| 8,102,123 | B2 * | 1/2012 | Espiau et al. ............ 315/111.71 |
| 2002/0011802 | A1 | 1/2002 | Espiau |
| 2005/0057158 | A1 | 3/2005 | Chang |
| 2005/0286263 | A1 | 12/2005 | Champion |
| 2007/0171006 | A1 | 7/2007 | Devincentis |

FOREIGN PATENT DOCUMENTS

| WO | 2005117069 | 12/2005 |
| WO | 2006129102 | 12/2006 |
| WO | 2011015807 | 2/2011 |
| WO | 2011048359 | 4/2011 |

* cited by examiner

*Primary Examiner* — Ashok Patel
(74) *Attorney, Agent, or Firm* — Jennifer Meredith, Esq.; Meredith & Keyhani, PLLC

(57) ABSTRACT

A light source to be powered by microwave energy, the source having: a body having a sealed void therein, a microwave-enclosing Faraday cage surrounding the body, a fill in the void of material excitable by microwave energy to form a light emitting plasma therein, and an antenna arranged within the body for transmitting plasma-inducing, microwave energy to the fill, the antenna having: a connection extending outside the body for coupling to a source of microwave energy; wherein the body is a solid plasma crucible of material which is lucent for exit of light therefrom, the plasma crucible is contoured with a contoured surface to reflect light internally within the lucent crucible material to exit in a particular direction, the Faraday cage is at least partially light transmitting for light exit from the plasma crucible in the particular direction.

18 Claims, 7 Drawing Sheets

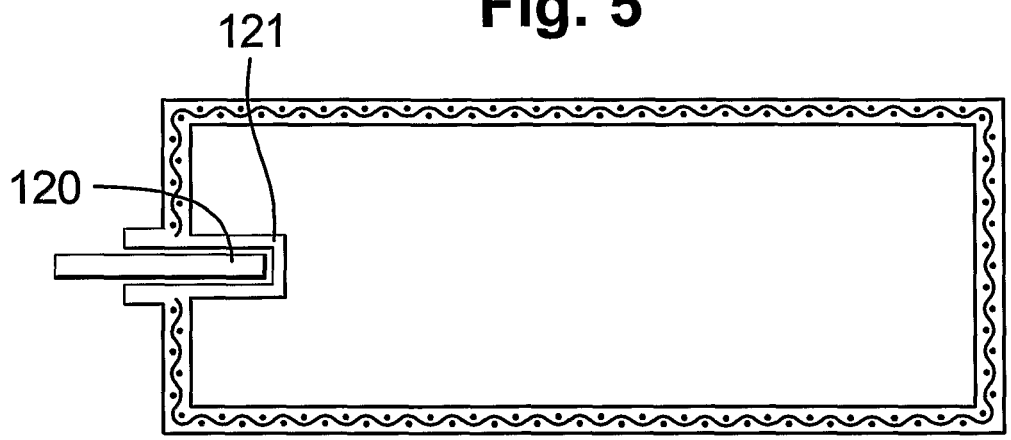
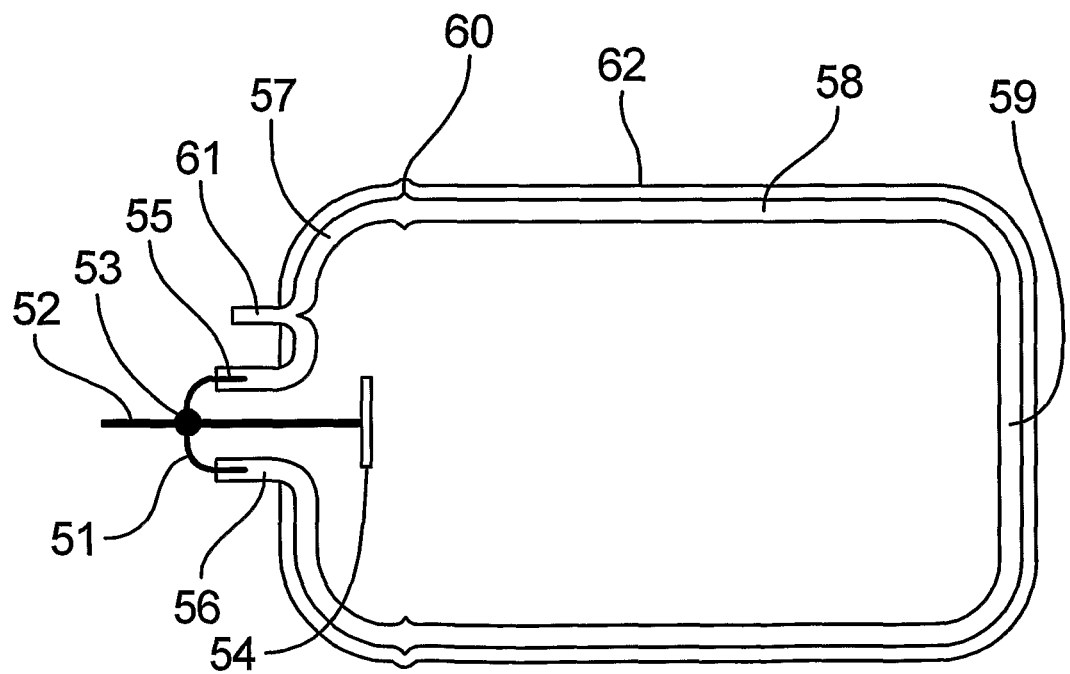

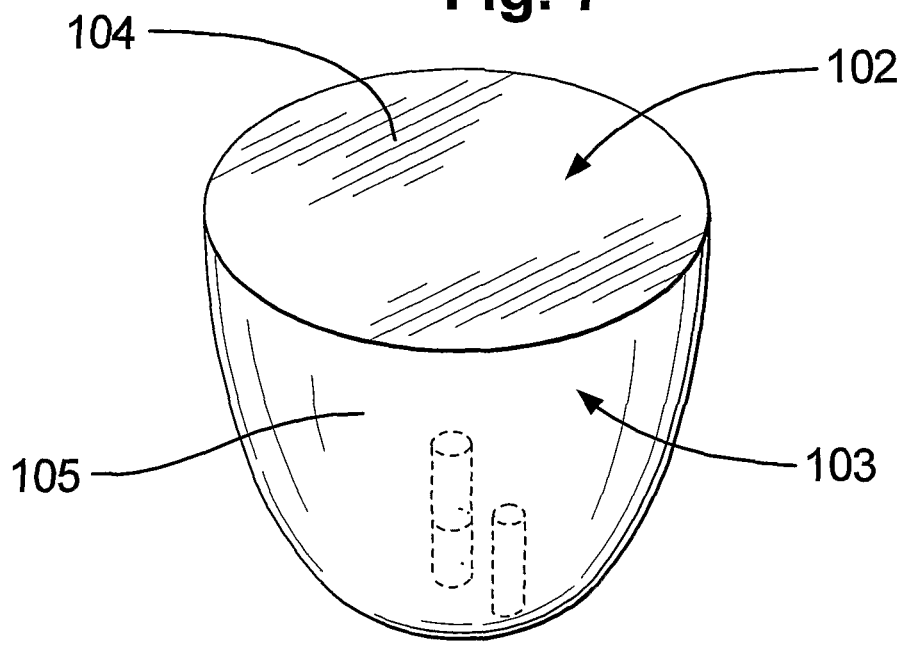
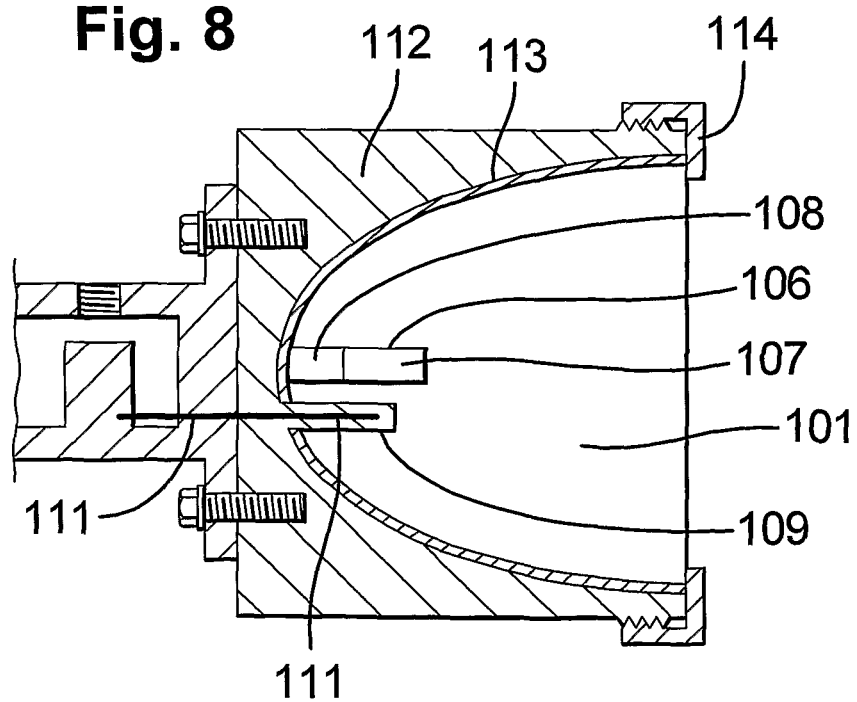

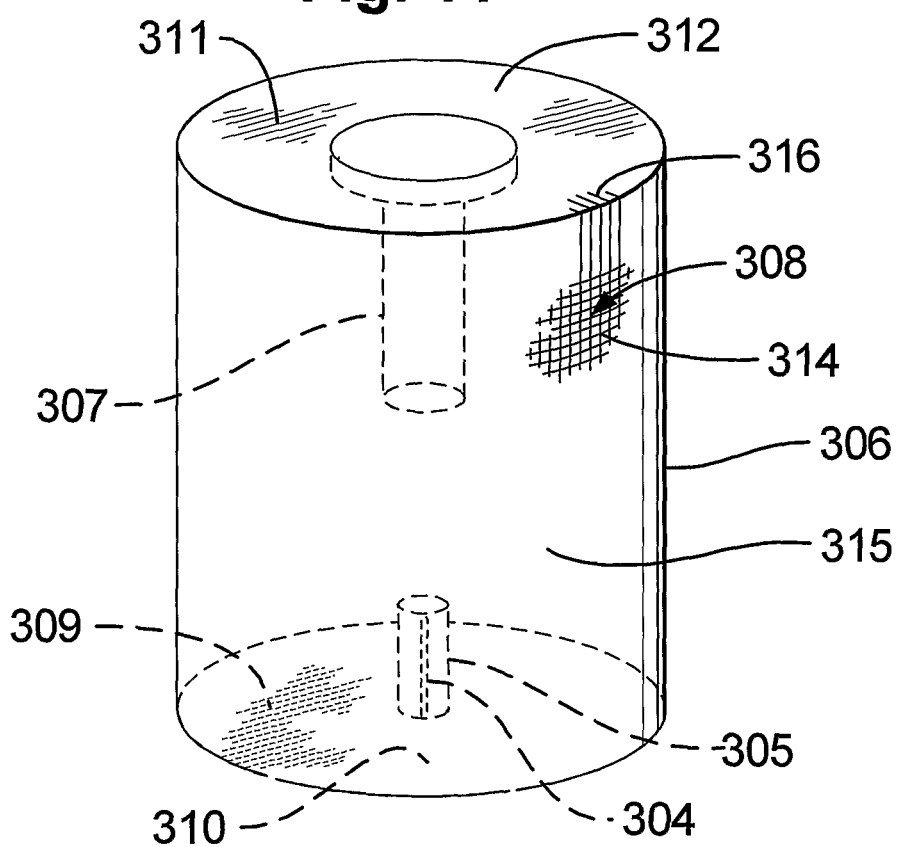
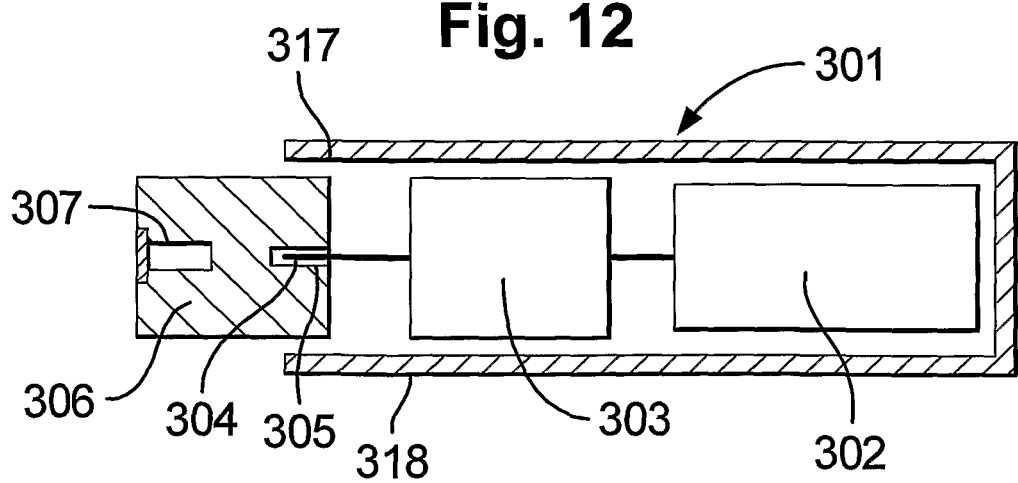

LIGHT SOURCE

This application is a continuation of co-pending U.S. patent application Ser. No. 12/671,088, filed Jan. 28, 2010 which is a national stage entry of and claims priority to PCT/GB08/03829 filed Nov. 14, 2008 which in turn claims priority to application numbers 0722548.5 filed Nov. 16, 2007 (Great Britain), 0809471.6 filed May 23, 2008 (Great Britain), 0814699.5 filed Aug. 12, 2008 (Great Britain) and 0814701.9 filed Aug. 12, 2008 (Great Britain), the entire contents of each are incorporated herein in their entirety.

The present invention relates to a light source for a microwave-powered lamp.

It is known to excite a discharge in a capsule with a view to producing light. Typical examples are sodium discharge lamps and fluorescent tube lamps. The latter use mercury vapour, which produces ultraviolet radiation. In turn, this excites fluorescent powder to produce light. Such lamps are more efficient in terms of lumens of light emitted per watt of electricity consumed than tungsten filament lamps. However, they still suffer the disadvantage of requiring electrodes within the capsule. Since these carry the current required for the discharge, they degrade and ultimately fail.

We have developed electrodeless bulb lamps, as shown in our patent application Nos. PCT/GB2006/002018 for a lamp (our "'2018 lamp"), PCT/GB2005/005080 for a bulb for the lamp and PCT/GB2007/001935 for a matching circuit for a microwave-powered lamp. These all relate to lamps operating electrodelessly by use of microwave energy to stimulate light emitting plasma in the bulbs. Earlier proposals involving use of an airwave for coupling the microwave energy into a bulb have been made for instance by Fusion Lighting Corporation as in their U.S. Pat. No. 5,334,913. If an air wave guide is used, the lamp is bulky, because the physical size of the wave guide is a fraction of the wave length of the microwaves in air. This is not a problem for street lighting for instance but renders this type of light unsuitable for many applications. For this reason, our '2018 lamp uses a dielectric wave-guide, which substantially reduces the wave length at the operating frequency of 2.4 Ghz. This lamp is suitable for use in domestic appliances such as rear projection television.

U.S. Pat. No. 6,737,809 describes: a light source to be powered by microwave energy, the source having:
  a body having a sealed void therein,
  a microwave-enclosing Faraday cage surrounding the body,
    the body and the cavity defining a resonant waveguide,
  a fill in the void of material excitable by microwave energy to form a light emitting plasma therein, and
  an antenna arranged within the body for transmitting plasma-inducing, microwave energy to the fill, the antenna having:
    a connection extending outside the body for coupling to a source of microwave energy.

We now believe that it is possible to coalesce the bulb and the wave guide into a single component. The object of the present invention is to provide an improved lamp having such a coalesced bulb and wave-guide.

According to the invention there is provided a light source to be powered by microwave energy, the source having: a body having a sealed void therein, a microwave-enclosing Faraday cage surrounding the body, the body within the Faraday cage being a resonant waveguide, a fill in the void of material excitable by microwave energy to form a light emitting plasma therein, and an antenna arranged within the body for transmitting plasma-inducing, microwave energy to the fill, the antenna having: a connection extending outside the body for coupling to a source of microwave energy; wherein: the body is a solid plasma crucible of material which is lucent for exit of light therefrom, the plasma crucible is contoured with a contoured surface to reflect light internally within the lucent crucible material to exit in a particular direction, the Faraday cage is at least partially light transmitting for light exit from the plasma crucible in the particular direction, the Faraday cage including: metalisation on the contoured surface of the plasma crucible to enhance reflection and forming part of the Faraday cage or a complementary reflector complementary to the contoured surface, positioned to reflect light back through the plasma crucible and forming part of the Faraday cage and the arrangement being such that light from a plasma in the void can pass through the plasma crucible and either pass directly from it via the cage or pass indirectly from it via the cage after reflection at the contoured surface.

As used in this specification: "lucent" means that the material, of which the item described as lucent, is transparent or translucent; "plasma crucible" means a closed body enclosing a plasma, the latter being in the void when the latter's fill is excited by microwave energy from the antenna.

Normally, the material of the crucible will be a solid, dielectric material.

Whilst it can be envisaged that the solid plasma crucible could have varying structures and compositions throughout its volume, particularly where it is comprised of more than one piece sealed together, we would normally expect it to be substantially homogenous throughout its volume.

In the second embodiment described below of the parent U.S. application Ser. No. 12/671,088 from which the present application has been divided, the plasma crucible is of circular cross-section and is dimensioned for a half wave to extend diametrically within it. This light source will normally be used with its light being reflected in a particular direction.

It is envisaged that the plasma crucible will be of quartz or sintered, transparent ceramic material, although other materials may also be suitable. In particular, the ceramic material can be translucent or transparent. An example of a suitable translucent ceramic is polycrystalline alumina and example of a transparent ceramic is polycrystalline Yttrium Aluminium Garnet—YAG. Other possible materials are aluminium nitride and single crystal sapphire.

The Faraday cage can be provided by coating the plasma crucible with a thin layer of conductive, transparent material, such as indium, tin oxide. Alternatively the plasma crucible can be encased in a mesh of conductive wire. Again the conductive mesh can be fused into the material of the plasma crucible, with plasma crucible material extending outside the mesh.

The antenna may extend into the plasma void, when of suitable material to resist attack by the fill particularly where the plasma crucible has a wall thickness that is small in comparison with distance within the plasma crucible from the Faraday cage at one side or end and to the other side or end. In this case, resonance can be established predominantly within the void. Such an antenna can be a rod extending into the void, but is preferably a plate, typically a disc, arranged transversely of the length of the plasma crucible. The connection for the antenna can extend sideways out of the plasma crucible in or close to a plane of the antenna; or, as is preferred, it can extend axially out of the plasma crucible, transversely of a plane of the antenna.

Alternatively, the antenna can be a rod of conductive metal extending within a re-entrant in the plasma crucible. Such re-entrant can be a thin walled projection into the void, with the rod antenna acting similarly to the plate antenna just mentioned. The re-entrant can be parallel to a length of the void or transverse to it. As an alternative, where the void is small in comparison with distance within the plasma crucible from the Faraday cage at one side or end and to the other, the re-entrant can be along side the void, with resonance being established across the plasma crucible, largely within the plasma crucible. In this case, the plasma crucible will have a dielectric constant greater than that of the ambient atmosphere and the wave length of the resonance will be shorter than its free space wavelength.

Whilst the plasma crucible can be one or an integer multiple of one wavelength of resonant microwaves within the plasma crucible, it is preferably one half of the wave length.

The fill material can be any of a number of elements known to emit light from a plasma, either alone or in combination.

Preferably, the Faraday cage includes at least one aperture for locally increasing light transmission therethrough. Usually, the aperture will be no bigger than one tenth of the free space wave length of the microwaves in the crucible. Typically for operation at 2.45 GHz, the aperture would be no bigger than $\frac{1}{10} \times 12.24$ cm, i.e. 12.24 mm and for 5.8 GHz no bigger than 6.12 mm.

More than one aperture can be provided. For instance, where light is taken both axially and radially from the crucible, correspondingly positioned apertures can be provided.

Provision of the apertured region allows radiation of more light from the light source than would be the case in its absence.

Preferably the lucent plasma crucible has:
a bore having a step and a counter-bore extending from the void to a surface of the crucible and
a plug of lucent material in the counter-bore and sealed to the crucible.

The step and the void can be formed by mechanical boring of the material of the crucible or other forming means, such as casting.

Whilst it is anticipated that with compatible coefficients of thermal expansion, as between artificial sapphire for the plug and lucent alumina for the crucible, the plug and crucible can be of different materials, normally they will be of the same material, typically quartz.

Again the plug can be sealed with a fusible material between the plug and the crucible, such as frit, but in the preferred embodiment the plug and the crucible are sealed by fusing of their own material. For fusing, the crucible can be heated as a whole. However local heating confined to the region of fusing is preferable. Typically this can be done with a laser.

The plug can be of the same depth as the step, in which case, the plug is flush with the surface of the crucible. However, the plug can be proud of the surface. These two alternatives are suitable where the void is to be close to the surface of the crucible. In a third alternative where the void is to be deeper in the crucible, the plug is recessed. In this latter embodiment, the length of the counter-bore to the surface can be filled with a further plug of the same material fixed, but not necessarily sealed, in the counter-bore, with the further plug flush with the surface. This arrangement allows the void to be central in the crucible and the crucible to appear—as regards its dielectric material—to behave as a single solid body (with the central void).

Preferably the light source is combined into a lamp with a source of microwaves and a matching circuit as a single integrated structure.

Whilst the microwave source can be a solid state oscillator and amplifier, in the preferred embodiment, in view of the output, the source is a magnetron. Typically the power of the magnetron will be 1 kW.

In the preferred embodiment, the matching circuit is a stub tuner, conveniently a three-stub tuner.

It should be noted that whereas usually light source of the invention are expected to use for producing visible light, they are suitable for producing invisible light as well, in particular ultra violet light.

To help understanding of the invention, various specific embodiments thereof will now be described by way of example and with reference to the accompanying drawings, in which:

FIG. 1 a side view of a light source in accordance with the invention of parent U.S. application Ser. No. 12/671,088 in combination as a lamp with a microwave drive circuit;

FIG. 5 is a view similar to FIG. 2 of an alternative light source, also in accordance with the invention of the parent U.S. application Ser. No. 12/671,088;

FIG. 6 is a perspective view of a plasma crucible of another light source of the invention of the parent U.S. application Ser. No. 12/671,088;

FIG. 7 is a perspective view of a lucent plasma crucible for a light source of the invention of the present application which has been divided from the parent U.S. application Ser. No. 12/671,088;

FIG. 8 is a cross-sectional side view of the further light source of the present invention, including a portion of a matching circuit and an adapter for the plasma crucible;

FIG. 11 is a perspective view of a further lucent plasma crucible according to the invention of the parent U.S. application Ser. No. 12/671,088 for a microwave powered lamp;

FIG. 12 is a diagrammatic view of a microwave powered lamp including the lucent plasma crucible of FIG. 11;

Figure 1:
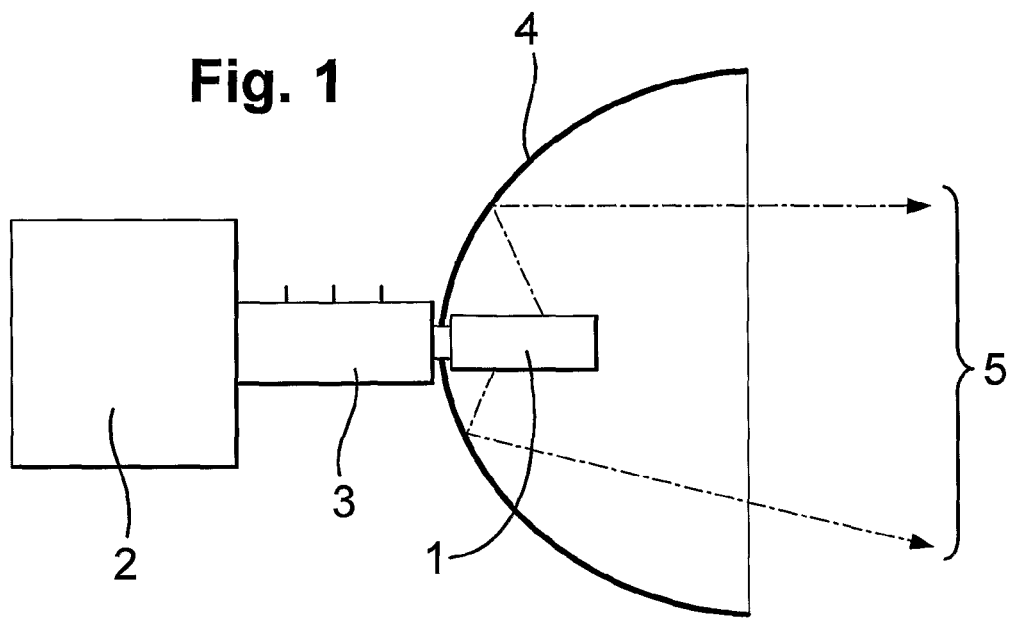
Figure 2:
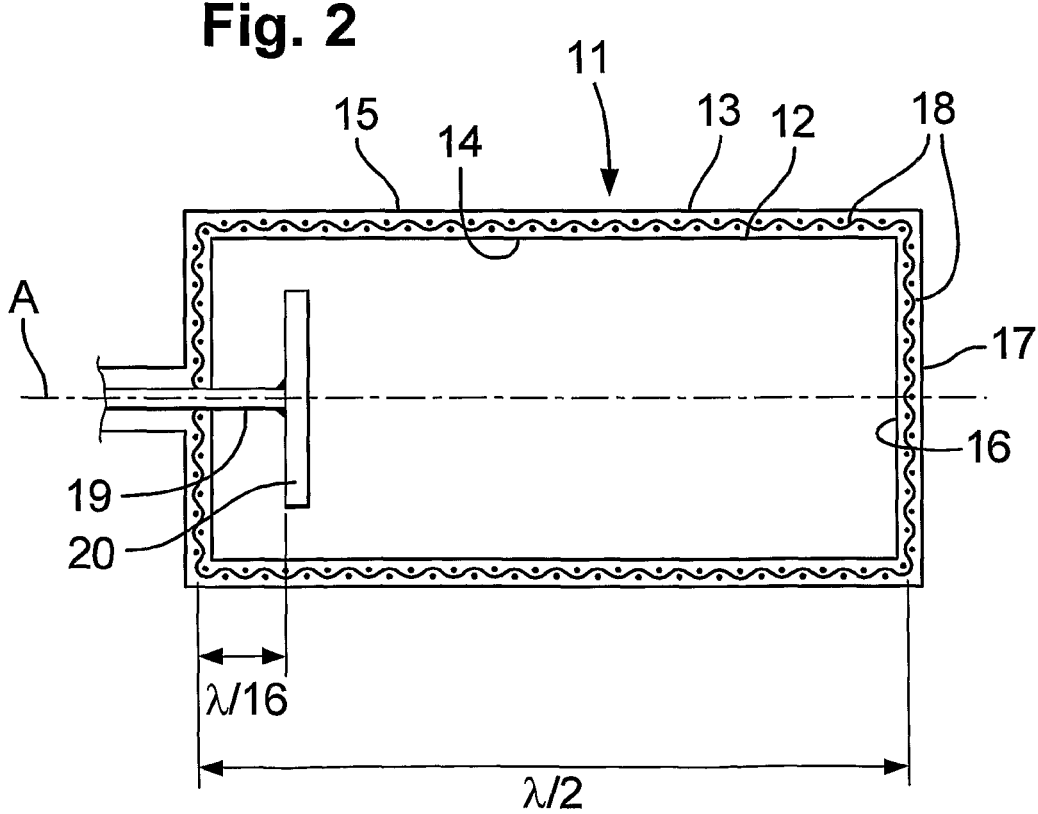
FIG. 2 is the light source in the lamp of FIG. 1, shown on a larger scale.
Figure 3:
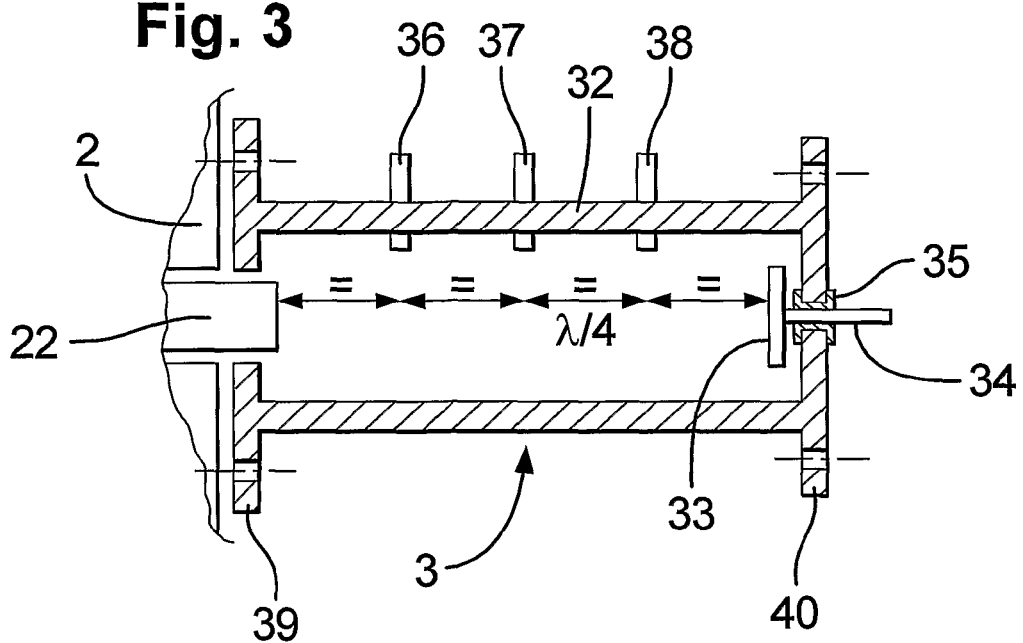
FIG. 3 is a similar view of the stub tuner of the microwave drive circuit of FIG. 1.
Figure 4:
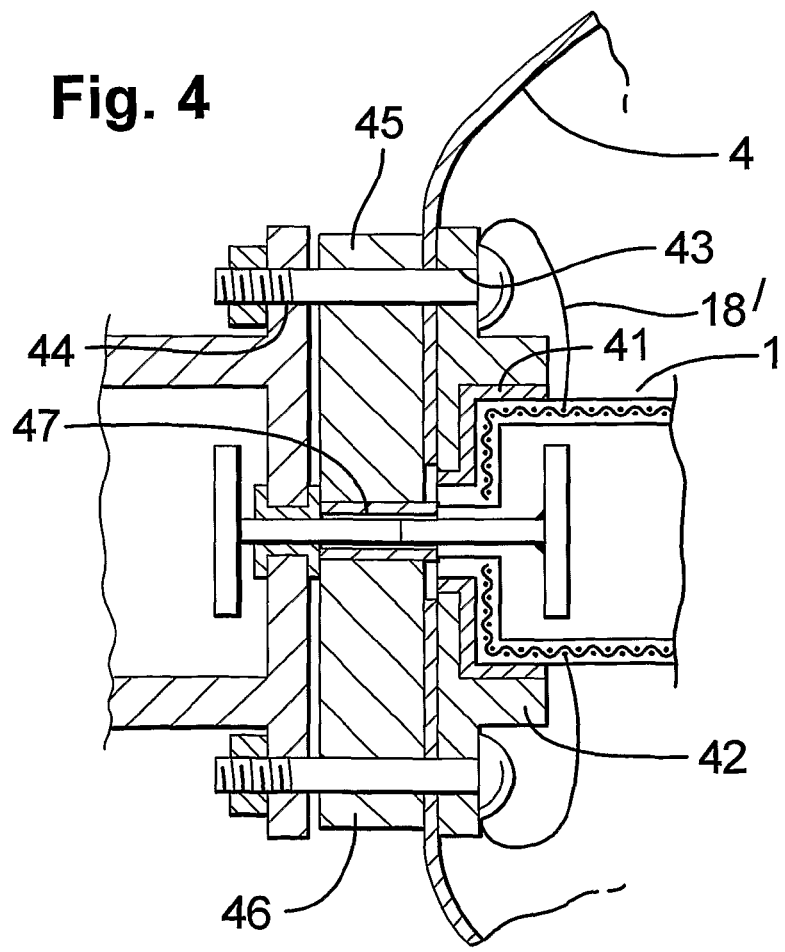
FIG. 4 is a scrap cross-sectional view of the junction between the light source and the stub tuner.

Referring to FIGS. 1 to 5 of the drawings, a lamp of the invention of parent U.S. application Ser. No. 12/671,088 comprises a light source in the form of a light emitting resonator 1, a magnetron 2 and a stub tuner 3. A reflector 4 is fitted at the junction of the light source and the stub tuner, for directing the light in a generally collimated beam 5.

The light emitting resonator comprises an crucible 11 formed of inner and outer envelopes 12, 13 of quartz. These are circular cylindrical tubes 14, 15, with respective end plates 16, 17. A Faraday cage in the form of a tungsten wire mesh 18, of a mesh size to exhibit a ground plane to microwaves within the resonator, is sandwiched between the tubes and the end plates respectively. Each envelope, comprised of its tube and end plates is hermetic. An earth connection 18' extends from the mesh to the outside of the envelope.

The length axially of the crucible between the wire mesh sandwiched between the end plates is $\lambda/2$ for the operating microwave frequency. At one end of the crucible, a molybdenum drive connection 19 extends to a tungsten disc 20. This is arranged transverse the axis A of the crucible at $\frac{1}{16}\lambda$ from the mesh at its end of the crucible. The crucible is filled with excitable plasma material, such as a dose of metal halide in a rare earth gas.

The disc acts as an antenna and is driven by the magnetron 2, via the matching circuit 3. The matching circuit is an air wave guide 32 of aluminium having the output antenna 22 of the magnetron as its input. The output antenna 33 of the matching circuit is a disc such as the resonator antenna disc and is connected to a connection 34 passing out of the matching circuit and insulated therefrom by an insulating bush 35. The matching circuit has three tuning stubs 36, 37, 38. These are arranged as λ/4, configuring the matching circuit as a stub tuner.

The matching circuit has flanges 39, 40 at its ends via which it is connected to the magnetron and the light source. The end of the latter is cemented 41 into a holder 42 of ceramic material. This has bores 43 at the same PCD as bores 44 in the flange 40 of the matching circuit and to which it is fastened by screws 45. A spacer ring 46 spaces the matching circuit and the holder, allowing the stub tuner and light source connections 34,19 to be coaxial and connected to each other by a clip 47. The reflector 4 is also carried on the screws between the holder 42 and the spacer 46. The earth connections 18' are also connected to the screws 45.

FIG. 5 shows an alternative light-emitting resonator, also having inner and outer envelopes of quartz with a ground plane mesh between them. In place of the disc antenna 20, a rod like antenna 120 extends in a re-entrant sleeve 121 of quartz, on the central axis of the envelopes. This arrangement completely isolates the antenna from the fill contents of the crucible, which is of advantage where the fill is particularly aggressive.

In operation, the magnetron, typically rated at 1 to 5 kW, inserts resonant microwave radiation via the stub tuner and the antenna 20 or 120 into the crucible. This forms a mixed dielectric resonant cavity. The resonance builds the intensity of the electric fields in the cavity such that the fill forms a plasma which radiates light. Typically the mode of resonance will be TE101. Further modes of resonance are also possible.

Typically at 5.8 GHz, the axial length of the crucible between the mesh at opposite ends and allowing for 1.5 mm of individual envelope wall thickness is 72 mm and the diameter is 31 mm. It will be appreciated that such a size, whilst too large for most domestic uses, is entirely suitable for illuminating larger environments.

The stub tuner can have internal dimensions of 114×40×20 mm. The stubs are set of the median plane by $\frac{1}{16}\lambda$. This has been found to be advantageous.

It is possible to replace the quartz material of the plasma crucible with transparent ceramic, in which case the connector in contact with the ceramic can be of niobium. Further in place of the mesh within the crucible walls, the crucible can be coated with an indium tin oxide—ITO—conductive coating.

As shown in FIG. 6, the light source can be constructed with a sub-assembly of an molybdenum end cap 51 having a molybdenum rod 52 brazed 53 into it and carrying a tungsten antenna 54. The edge 55 of the cap is let into a neck 56 of the quartz end cover 57 of the crucible. This sub-assembly is sealed on the cylindrical body 58 and opposite end 59 of the crucible at a seal 60. The cover 57 has a charge tube 61, through which the excitable material charge and noble gas fill can be introduced. The tube is sealed off. The Faraday cage 62 is provided in the form of an ITO coating.

Turning on now to FIGS. 7 & 8, a lamp of the invention of the present divisional application will now be described. It has a solid plasma crucible 101 of polished quartz, with a flat front face 102 and a parabolic rear face 103. The front face is coated with indium tin oxide 104 to render it electrically conductive, yet transparent. In electrical contact with the ITO layer, is a platinum layer 105 on the parabolic rear. These two layers together form a Faraday cage around the quartz plasma crucible.

At the focus of the parabola and aligned with its central axis is a void 106, filled with microwave excitable material 107, typically indium halide in xenon. The void is a bore in the quartz, that is sealed by means of a plug 108, the plug having been fused in place without other material by laser sealing.

Alongside the void is a receptacle 109 in the quartz for a metal rod antenna 110. This is connected directly to the output 111 of a matching circuit such as the circuit 3. An adaptor plate 112 of the circuit has a contour 113 complementary to that of the rear face of the quartz plasma crucible. A fastening ring 114 pulls the quartz into contact with the end plate, for grounding of the Faraday cage.

On propagation of microwaves from the matching circuit, resonance is set up in the quartz plasma crucible and a plasma is established in the void. Light is emitted from the halide in the void. This either leaves the plasma crucible directly through the front face 102 or is reflected by the platinum layer 105 at the parabolic back face 103 forwards to exit the front face.

Typically, the quartz plasma crucible is 49 mm in diameter for 2.4 GHz microwaves and 31.5 mm for 5.8 GHz. In either case, the void is 5 mm in diameter and the plug is 8 mm long, leaving a 10 mm long void. The antenna receptacle 109 is 2 mm in diameter, being 5 mm eccentric from the void, which is on the central axis of the plasma crucible.

It should be noted that by comparison with prior electrodeless lamps using small bulbs in opaque wave guides, where the light exit is restricted to the diameter of the bulb, not only can light exit from the full front face of the wave guide, which is significantly larger than the diameter of the plasma void 106, sideways and rearwards propagating light is reflected forwards and out of the lamp.

Figure 9:
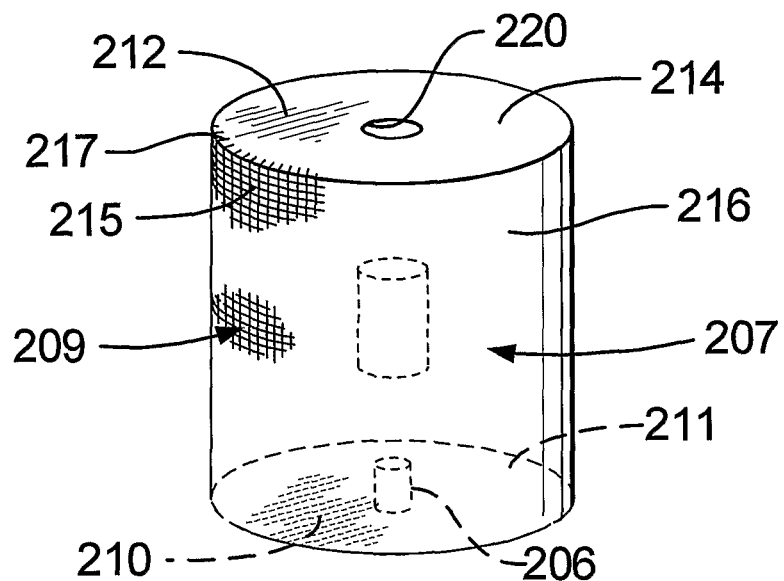
FIG. 9 is a perspective view of a lucent plasma crucible for another light, again in accordance with the invention of the parent U.S. application Ser. No. 12/671,088.
Figure 10:
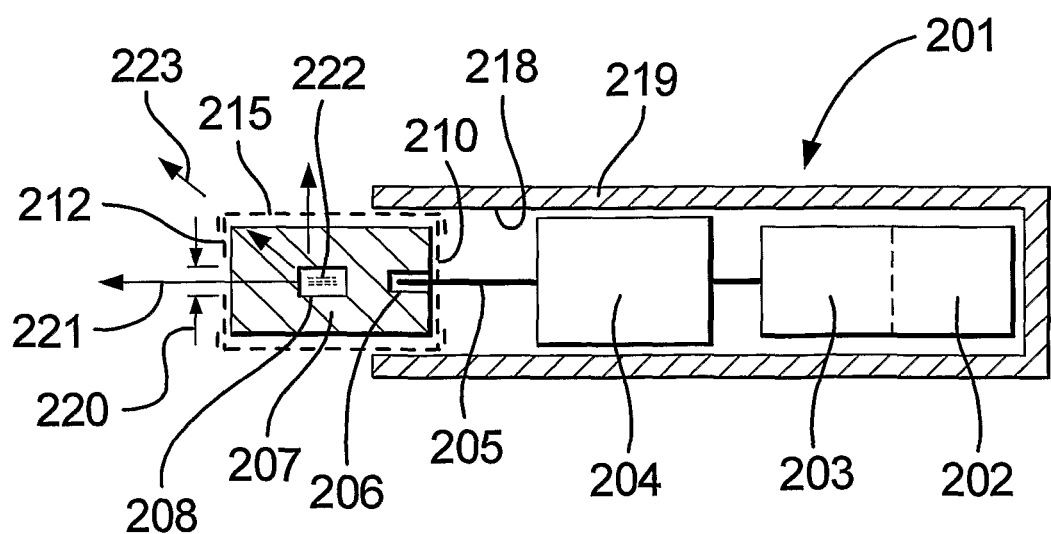
FIG. 10 is a diagrammatic view of a microwave powered lamp including the lucent plasma crucible of FIG. 9.

Referring to FIGS. 9 and 10, a lamp 201 of parent U.S. application Ser. No. 12/671,088 comprises an oscillator 202 and amplifier 203 together forming a source of microwave energy, typically operating at 2.45 or 5.8 GHz or other frequencies within an ISM band. The source passes the microwaves via a matching circuit 204 to an antenna 205 extending into a re-entrant 206 in a lucent, plasma crucible 207. This is of quartz and has a central void 208 containing a fill of noble gas and a microwave excitable material, which radiates light when excited by microwaves. The quartz being transparent, light can leave it in any direction, subject to the constraints provided by the Faraday cage described below.

The crucible is a right circular cylinder, 63 mm long and 43 mm in diameter. Centrally in the crucible, the void is 10 mm long and 3 mm in diameter. The re-entrant is co-axial with the void, being 2 mm in diameter and 10 mm long.

A Faraday cage 209 surrounds the crucible and comprises:
a light reflective coating 210, typically of silver with silicon monoxide, across the end surface 211 having the antenna re-entrant,
an indium tin oxide (ITO) deposit 212 on the end surface 214 and
a conductive, chemical-vapour-deposited mesh 215 on the cylindrical surface 216, the mesh having fingers 217 which extend onto the ends, for electrical interconnection of the elements 210, 212 & 215. The lines of the mesh are 0.5 mm wide and set at a pitch of 6.0 mm.

The Faraday cage is earthed by being received in a recess 218 in a housing 219.

The ITO deposit has an un-plated 12 mm aperture 220 centrally placed in the end face 214, whereby light 221 from the end of the plasma discharge 222 in the void can pass directly out of the lucent plasma crucible, without attenuation in by the Faraday cage. Much light also passes out via the Faraday cage, although attenuated to an extent.

It should be noted that Faraday cage can be formed entirely of wire mesh formed around the crucible, with an aperture in line with the void.

Referring to FIGS. 11 & 12 of the drawings, a lamp 301 of parent U.S. application Ser. No. 12/671,088 comprises an oscillator and amplifier source 302 of microwave energy, typically operating at 2.45 or 5.8 GHz or other frequencies within an ISM band. The source passes the microwaves via a matching circuit 303 to an antenna 304 extending into a re-entrant 305 in a lucent, plasma crucible 306. This is of quartz and has a central void 307 containing a fill of noble gas and a microwave excitable material, which radiates light when excited by microwaves. The quartz being transparent, light can leave it in any direction, subject to the constraints provided by the Faraday cage described below.

The crucible is a right circular cylinder, 63 mm long and 43 mm in diameter. Centrally in the crucible, on its central longitudinal axis A, the void is 10 mm long and 3 mm in diameter. The re-entrant is co-axial with the void, being 2 mm in diameter and 10 mm long.

A Faraday cage 308 surrounds the crucible and comprises:
a light reflective coating 310, typically of silver with silicon monoxide, 309 across the end surface 310 having the antenna re-entrant, the plating being reflective for reflecting light from a plasma in the void out of the crucible,
an indium tin oxide (ITO) deposit 311 on an end surface 312 of the crucible, the ITO coating passing light from the plasma and
a conductive, chemical-vapour-deposited mesh 314 on the cylindrical surface 315, the mesh having fingers 316 which extend onto the ends, for electrical interconnection of the elements 309, 311 & 314. Light from the plasma can exit the crucible between the mesh lines.

The Faraday cage is earthed by being partially received in a recess 317 in an aluminium housing 318.

The end surface 312 has a bore 321 for receiving a plug 322, of the same material as the crucible, namely quartz. The bore forms a step 324 on which the plug is located with its outer surface 325 flush with the surface 312 and to which the central void extends. The plug is sealed to the seat by laser sealing at the corner between bore 321 and the step 324.

Figure 13:
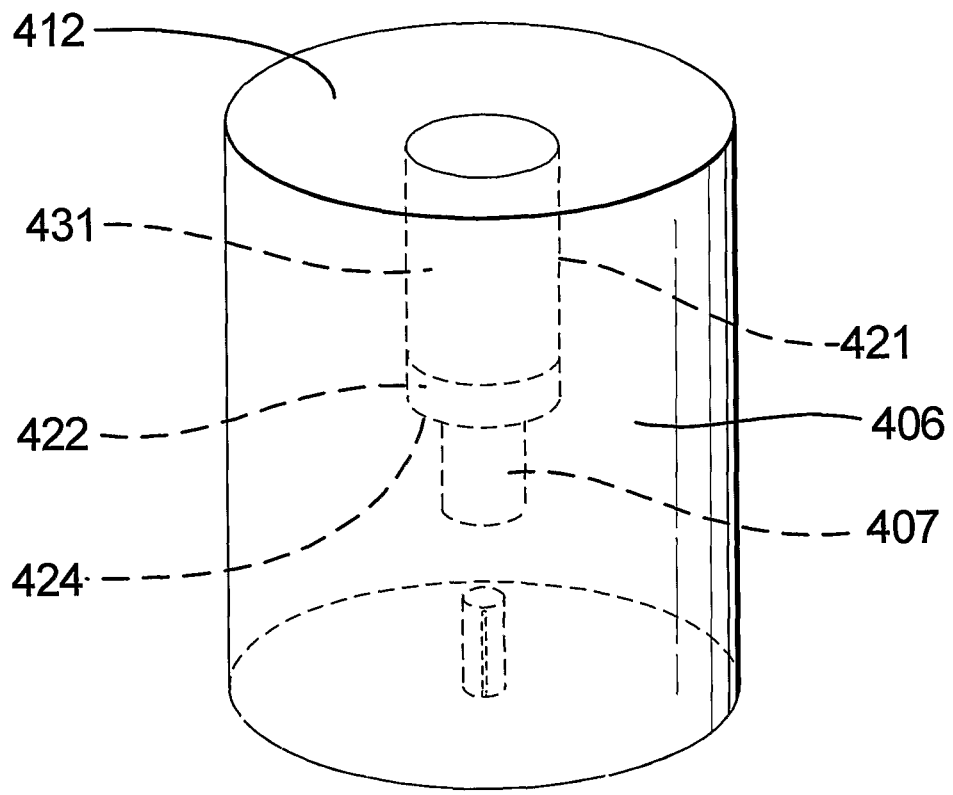
FIG. 13 is a view similar to FIG. 11 of another lucent plasma crucible according to the invention of the parent U.S. application Ser. No. 12/671,088
Figure 14:
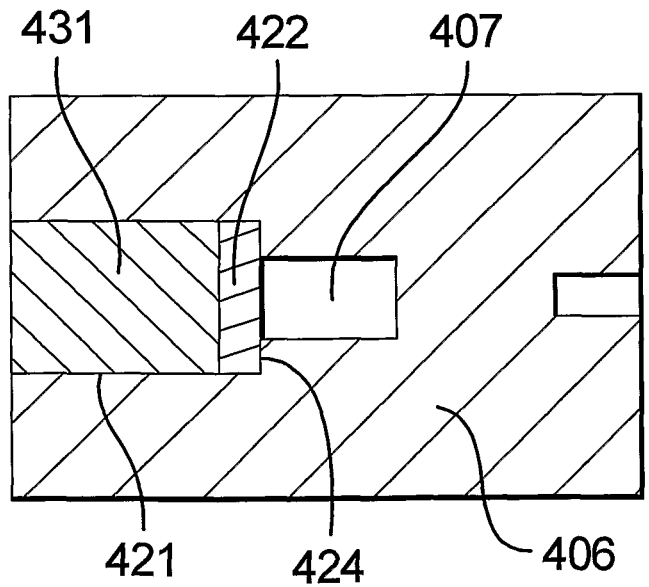
FIG. 14 is a view similar to FIG. 12 of the crucible of FIG. 13 only.

Turning now to FIGS. 13 and 14, the light source there shown of parent U.S. application Ser. No. 12/671,088—without any of its drive antenna, Faraday cage nor a microwave source and matching circuit shown is largely similar to that of FIGS. 11 & 12. The crucible 406 has a central void 407, which is truly at the centre of crucible, both longitudinally and diametrically whereas the void 307 is diametrically central only. The bore 421 extends deeper into the crucible with the plug 422 being of the same thickness and resting on the step 424 at the junction of the bore and the void. The plug 422 is laser sealed in the same way as the plug 322.

Outside the plug 422, in the bore 421 is a further plug 431 extending from the plug 422 to the surface 412 of the crucible. Thus for the purposes of microwave resonance, the crucible is a continuous piece of material with the dielectric constant of quartz.

The invention is not intended to be restricted to the details of the above described embodiments. For instance, the two plugs 422 and 431 could be provided as a single whole.

Although the claimed subject matter has been fully described in connection with examples thereof and with reference to the accompanying drawings, it is to be noted that various changes and modifications will become apparent to those skilled in the art. Such changes and modifications are to be understood as being included within the scope of the present disclosure as defined by the appended claims.

The invention claimed is:

1. A light source to be powered by microwave energy, the source having:
   a body having a sealed void therein,
   a microwave-enclosing Faraday cage surrounding the body,
   a fill in the void of material excitable by microwave energy to form a light emitting plasma therein, and
   an antenna arranged within the body for transmitting plasma-inducing, microwave energy to the fill, the antenna having:
     a connection extending outside the body for coupling to a source of microwave energy;
wherein:
   the body is a solid plasma crucible of material which is lucent for exit of light therefrom,
   the plasma crucible is contoured with a contoured surface to reflect light internally within the lucent crucible material to exit in a particular direction,
   the Faraday cage is at least partially light transmitting for light exit from the plasma crucible in the particular direction, the Faraday cage including:
     metalisation on the contoured surface of the plasma crucible to enhance reflection and forming part of the Faraday cage or
     a complementary reflector complementary to the contoured surface, positioned to reflect light back through the plasma crucible and forming part of the Faraday cage and
   the arrangement being such that light from a plasma in the void can pass through the plasma crucible and either
   pass directly from it via the cage or
   pass indirectly from it via the cage after reflection at the contoured surface.

2. A light source as claimed in claim 1, wherein the plasma crucible is of a plurality of pieces sealed together.

3. A light source as claimed in claim 1, wherein the plasma crucible is homogenous.

4. A light source as claimed in claim 1, wherein the plasma crucible is of circular cross-section and is dimensioned for a half wave to extend diametrically within it.

5. A light source as claimed in claim 1, wherein the plasma crucible is of quartz or polycrystalline alumina or polycrystalline Yttrium Aluminium Garnet or aluminium nitride or single crystal sapphire.

6. A light source as claimed in claim 1, wherein for light exit from the plasma crucible in the particular direction the Faraday cage is of or includes a thin layer of conductive, transparent material and/or a mesh of conductive wire and/or reticular metal sheet.

7. A light source as claimed in claim 6, wherein the conductive mesh or reticular sheet is fused into the material of the plasma crucible.

8. A light source as claimed in claim 6, wherein the Faraday cage includes at least one aperture for locally increasing light transmission therethrough, the aperture preferably being is no bigger than one tenth of the free space wave length of the microwaves in the crucible.

9. A light source as claimed in claim 1, wherein the antenna is a rod or wire of conductive metal extending within a re-entrant in the plasma crucible and the connection is an integral extension of the antenna rod or wire.

10. A light source as claimed in claim 1, wherein the void is small in comparison with a distance within the plasma crucible from the Faraday cage at one side or end and to the opposite side or end and the re-entrant is along side or in line with the void.

11. A light source as claimed in claim 1, wherein the lucent plasma crucible has:
- a bore having a step and a counter-bore extending from the void to a surface of the crucible and
- a plug of lucent material in the counter-bore and sealed to the crucible.

12. A light source as claimed in claim 11, wherein the crucible and the plug are of vitreous material and the plug is sealed to the crucible by local melting of the material of the plug at the step and/or the counter-bore.

13. A light source as claimed in claim 12, wherein the crucible and the plug are of ceramic material and the plug is sealed to the crucible by local melting of frit material at the step and/or the counter-bore.

14. A light source as claimed in claim 11, wherein the plug is flush with the crucible at outer surfaces thereof.

15. A light source as claimed in claim 11, wherein the sealed plug is recessed and a second plug is provided in the counter-bore flush with the crucible at outer surfaces thereof.

16. A light source as claimed in claim 1, in combination as a lamp with a microwave drive circuit comprising:
- a microwave source and
- a matching circuit.

17. A light source as claimed in claim 1, the body within the Faraday cage being a resonant waveguide.

18. A light source as claimed in claim 1, wherein the void is formed by a bore in the body.

* * * * *